(12) United States Patent
Kanemori et al.

(10) Patent No.: US 10,017,164 B2
(45) Date of Patent: Jul. 10, 2018

(54) BRAKE LOAD ALLEVIATION FUNCTIONS

(71) Applicant: The Boeing Company, Chicago, IL (US)

(72) Inventors: Scott Brandon Kanemori, Seattle, WA (US); Bruce Lam, Everett, WA (US); David T. Yamamoto, Seattle, WA (US); Thomas Todd Griffith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/870,665

(22) Filed: Jan. 12, 2018

(65) Prior Publication Data

US 2018/0134265 A1    May 17, 2018

Related U.S. Application Data

(63) Continuation of application No. 14/038,504, filed on Sep. 26, 2013.

(51) Int. Cl.
| | |
|---|---|
| *B60T 8/17* | (2006.01) |
| *B60T 8/00* | (2006.01) |
| *B64C 25/42* | (2006.01) |
| *B60T 8/32* | (2006.01) |

(52) U.S. Cl.
CPC ............. *B60T 8/1703* (2013.01); *B60T 8/00* (2013.01); *B60T 8/325* (2013.01); *B64C 25/42* (2013.01); *B64C 25/426* (2013.01); *B60T 2201/03* (2013.01)

(58) Field of Classification Search
CPC ................................. B60T 8/00; B60T 8/1703
See application file for complete search history.

(56) References Cited

U.S. PATENT DOCUMENTS

| | | | |
|---|---|---|---|
| 4,007,970 A * | 2/1977 | Romero .................... | B60T 7/12 |
| | | | 244/111 |
| 4,923,056 A | 5/1990 | Nedelk | |
| (Continued) | | | |

FOREIGN PATENT DOCUMENTS

| | | |
|---|---|---|
| CN | 101730637 | 6/2010 |
| JP | H9-118211 A | 5/1997 |
| (Continued) | | |

*Primary Examiner* — Jess Whittington
(74) *Attorney, Agent, or Firm* — Haynes and Boone, LLP

(57) ABSTRACT

A system, method, and apparatus for brake load alleviation amongst at least one first brake and at least one second brake is disclosed. The method involves sensing an amount of brake pedal application in response to engagement of at least brake pedal. The method further involves determining whether the amount of brake pedal application is greater than a brake pedal application threshold value. Also, the method involves generating a brake application profile, when it is determined that the amount of brake pedal application is greater than the brake pedal application threshold value. The brake application profile indicates that actuation of at least one first brake is delayed by a first time delay, and that actuation of at least one second brake is delayed by a second time delay. Further, the method involves actuating at least one first brake and at least one second brake according to the brake application profile.

20 Claims, 9 Drawing Sheets

(56) References Cited

U.S. PATENT DOCUMENTS

| | | | |
|---|---|---|---|
| 5,024,491 A * | 6/1991 | Pease, Jr. | B60T 7/12 303/126 |
| 5,962,997 A | 10/1999 | Maisch | |
| 6,081,081 A | 6/2000 | Maisch | |
| 6,142,585 A | 11/2000 | Gowan et al. | |
| 7,717,527 B1 * | 5/2010 | Griffith | B60T 8/00 303/126 |
| 8,386,094 B2 * | 2/2013 | DeVlieg | B60T 8/1703 244/111 |
| 2002/0026272 A1 | 2/2002 | Yamamoto et al. | |
| 2005/0040286 A1 * | 2/2005 | Radford | B60T 8/1703 244/111 |
| 2005/0231030 A1 | 10/2005 | Frank | |
| 2008/0001471 A1 | 1/2008 | Rudd | |
| 2008/0149436 A1 | 6/2008 | Griffith et al. | |
| 2009/0065635 A1 | 3/2009 | Regis et al. | |
| 2009/0065640 A1 * | 3/2009 | Regis | B60T 8/1703 244/111 |
| 2010/0109429 A1 | 5/2010 | Griffith | |
| 2010/0222942 A1 * | 9/2010 | DeVlieg | B60T 8/00 701/3 |
| 2010/0274457 A1 * | 10/2010 | Cahill | B60T 8/1703 701/70 |
| 2011/0130935 A1 | 6/2011 | Krueger et al. | |
| 2011/0278916 A1 * | 11/2011 | DeVlieg | B60T 8/00 303/126 |
| 2012/0136547 A1 * | 5/2012 | Miyazaki | B60T 1/10 701/70 |
| 2014/0156160 A1 * | 6/2014 | DeVlieg | B60T 8/00 701/70 |

FOREIGN PATENT DOCUMENTS

| | | |
|---|---|---|
| JP | 2013121838 | 6/2013 |
| WO | WO 2008/097260 | 8/2008 |

\* cited by examiner

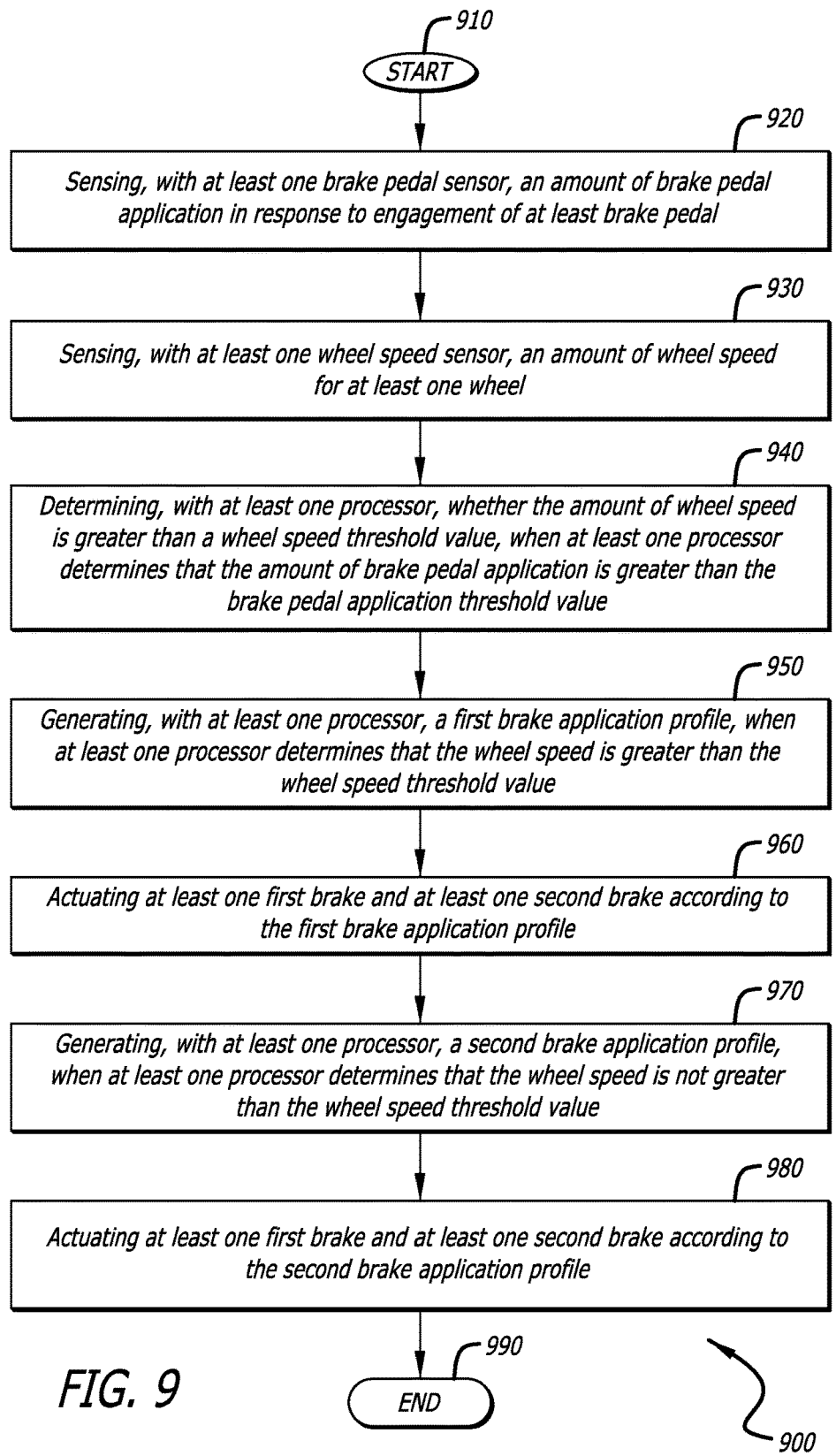

BRAKE LOAD ALLEVIATION FUNCTIONS

CROSS-REFERENCE TO RELATED APPLICATION

This application is a Continuation application of, and claims priority to and the benefit of, U.S. patent application Ser. No. 14/038,504, filed Sep. 26, 2013, the entire disclosure of which is expressly incorporated by reference herein.

BACKGROUND

The present disclosure relates to aircraft brake load alleviation functions.

Currently applying heavy braking on an aircraft can result in dynamic loads being applied to the airplane structure particularly in the fuselage and nose gear areas. These dynamic loads can be large enough to drive the design of the structure which typically results in the aircraft weighing more to accommodate them.

SUMMARY

The present disclosure relates to a method, system, and apparatus for brake load alleviation function that helps to minimize the dynamics during heavy braking on an aircraft by delaying the onset of a subset of the brakes. The delay can lower the peak dynamic load on the nose gear and is a function of the amount of brake pedal applied and the aircraft speed (refer to FIGS. 1A and 1B). In one or more embodiments, a method is disclosed for brake load alleviation amongst at least one first brake and at least one second brake for a vehicle. The method involves sensing, with at least one brake pedal sensor, an amount of brake pedal application in response to engagement of at least one brake pedal. The method further involves determining, with at least one processor, whether the amount of brake pedal application is greater than a brake pedal application threshold value. Also, the method involves generating, with at least one processor, a brake application profile, when at least one processor determines that the amount of brake pedal application is greater than the brake pedal application threshold value. In one or more embodiments, the brake application profile indicates that actuation of at least one first brake is not delayed and that actuation of at least one second brake is delayed by a time delay. Further, the method involves actuating at least one first brake and at least one second brake according to the brake application profile.

In one or more embodiments, the brake application profile indicates that actuation of at least one first brake increases at a first rate over time and that actuation of at least one second brake increases at a second rate over time. In at least one embodiment, at least one first brake is at least one forward brake, and at least one second brake is at least one aft brake. In other embodiments, at least one first brake is at least one aft brake, and at least one second brake is at least one forward brake.

In at least one embodiment, the amount of brake pedal application is related to a rate of the engagement of at least brake pedal. In one or more embodiments, the rate of the engagement of at least one brake pedal is related to an amount of braking force applied to at least brake pedal. In some embodiments, the rate of the engagement of at least one brake pedal is related to a degree that at least brake pedal is depressed.

In one or more embodiments, the first time delay is greater than the second time delay. In other embodiments, the second time delay is greater than the first time delay.

In at least one embodiment, a method for brake load alleviation amongst at least one first brake and at least one second brake for a vehicle involves sensing, with at least one brake pedal sensor, an amount of brake pedal application in response to engagement of at least one brake pedal. The method further involves sensing, with at least one wheel speed sensor, an amount of wheel speed for at least one wheel. Also, the method involves determining, with at least one processor, whether the amount of brake pedal application is greater than a brake pedal application threshold value. In addition, the method involves determining, with at least one processor, whether the amount of wheel speed is greater than a wheel speed threshold value, when at least one processor determines that the amount of brake pedal application is greater than the brake pedal application threshold value. Additionally, the method involves generating, with at least one processor, a first brake application profile, when at least one processor determines that the wheel speed is greater than the wheel speed threshold value. Further, the method involves generating, with at least one processor, a second brake application profile, when at least one processor determines that the wheel speed is not greater than the wheel speed threshold value.

In one or more embodiments, a method for brake load alleviation amongst at least one first brake and at least one second brake for a vehicle involves sensing, with at least one brake pedal sensor, an amount of brake pedal application in response to engagement of at least one brake pedal. The method further involves sensing, with at least one speed sensor, an amount of speed. Also, the method involves determining, with at least one processor, whether the amount of brake pedal application is greater than a brake pedal application threshold value. In addition, the method involves determining, with at least one processor, whether the amount of speed is greater than a speed threshold value, when at least one processor determines that the amount of brake pedal application is greater than the brake pedal application threshold value. Additionally, the method involves generating, with at least one processor, a first brake application profile, when at least one processor determines that the amount of speed is greater than the speed threshold value. Further the method involves, generating, with at least one processor, a second brake application profile, when at least one processor determines that the amount of speed is not greater than the speed threshold value.

In at least one embodiment, at least one speed sensor is a wheel speed sensor and/or a vehicle speed sensor. In some embodiments, the speed threshold value is a wheel speed threshold value or a vehicle speed threshold value.

In one or more embodiments, the first brake application profile indicates that actuation of at least one first brake is delayed by a first time delay and that actuation of at least one second brake is delayed by a second time delay. In at least one embodiment, the second brake application profile indicates that actuation of at least one first brake is delayed by a third time delay and that actuation of at least one second brake is delayed by a fourth time delay. In some embodiments, a difference between the first time delay and the second time delay is less than a difference between the third time delay and the fourth time delay.

In one or more embodiments, the third time delay is greater than the fourth time delay. In other embodiments, the fourth time delay is greater than the third time delay.

In at least one embodiment, the method further involves actuating at least one first brake and at least one second brake according to the first brake application profile. In one or more embodiments, the method further involves actuating at least one first brake and at least one second brake according to the second brake application profile. In some embodiments, the first brake application profile indicates that actuation of at least one first brake increases at a first rate over time and that actuation of at least one second brake increases at a second rate over time. In at least one embodiment, the second brake application profile indicates that actuation of at least one first brake increases at a first rate over time and that actuation of at least one second brake increases at a second rate over time.

In one or more embodiments, a system for brake load alleviation amongst at least one first brake and at least one second brake for a vehicle involves at least one brake pedal, and at least one brake pedal sensor to sense an amount of brake pedal application in response to engagement of at least brake pedal. The system further involves at least one processor to determine whether the amount of brake pedal application is greater than a brake pedal application threshold value, and to generate a brake application profile when at least one processor determines that the amount of brake pedal application is greater than the brake pedal application threshold value. In one or more embodiments, the brake application profile indicates that actuation of at least one first brake is delayed by a first time delay and that actuation of at least one second brake is delayed by a second time delay. Further, the system involves at least one first brake to be actuated according to the brake application profile, and at least one second brake to be actuated according to the brake application profile.

In at least one embodiment, a system for brake load alleviation amongst at least one first brake and at least one second brake for a vehicle involves at least one brake pedal, and at least one brake pedal sensor to sense an amount of brake pedal application in response to engagement of at least one brake pedal. The system further involves at least one wheel, and at least one wheel speed sensor to sense an amount of wheel speed of at least one wheel. Also, the system involves at least one processor to determine whether the amount of brake pedal application is greater than a brake pedal application threshold value; to determine whether the amount of wheel speed is greater than a wheel speed threshold value, when at least one processor determines that the amount of brake pedal application is greater than the brake pedal application threshold value; to generate a first brake application profile, when at least one processor determines that the wheel speed is greater than the wheel speed threshold value; and to generate a second brake application profile, when at least one processor determines that the wheel speed is not greater than the wheel speed threshold value.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 5:
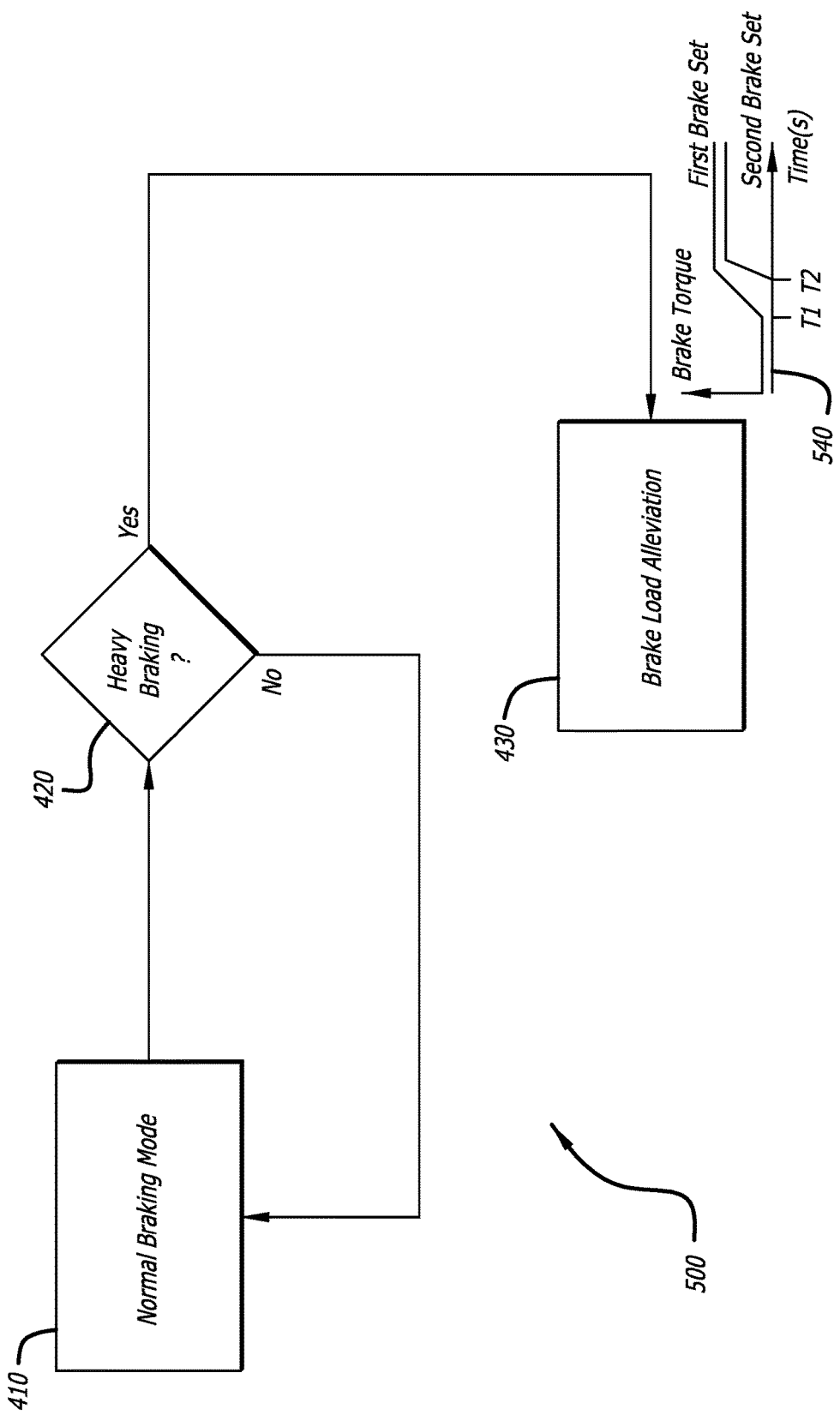

FIG. 5 is a schematic diagram depicting the disclosed logic for brake load alleviation amongst at least one first brake and at least one second brake for a vehicle, where the brake application profile shows that (1) actuation of at least one second brake is delayed after actuation of at least one first brake and shows that (2) actuation of at least one second brake is at a higher rate than actuation of at least one first brake, in accordance with at least one embodiment of the present disclosure.

Figure 6:
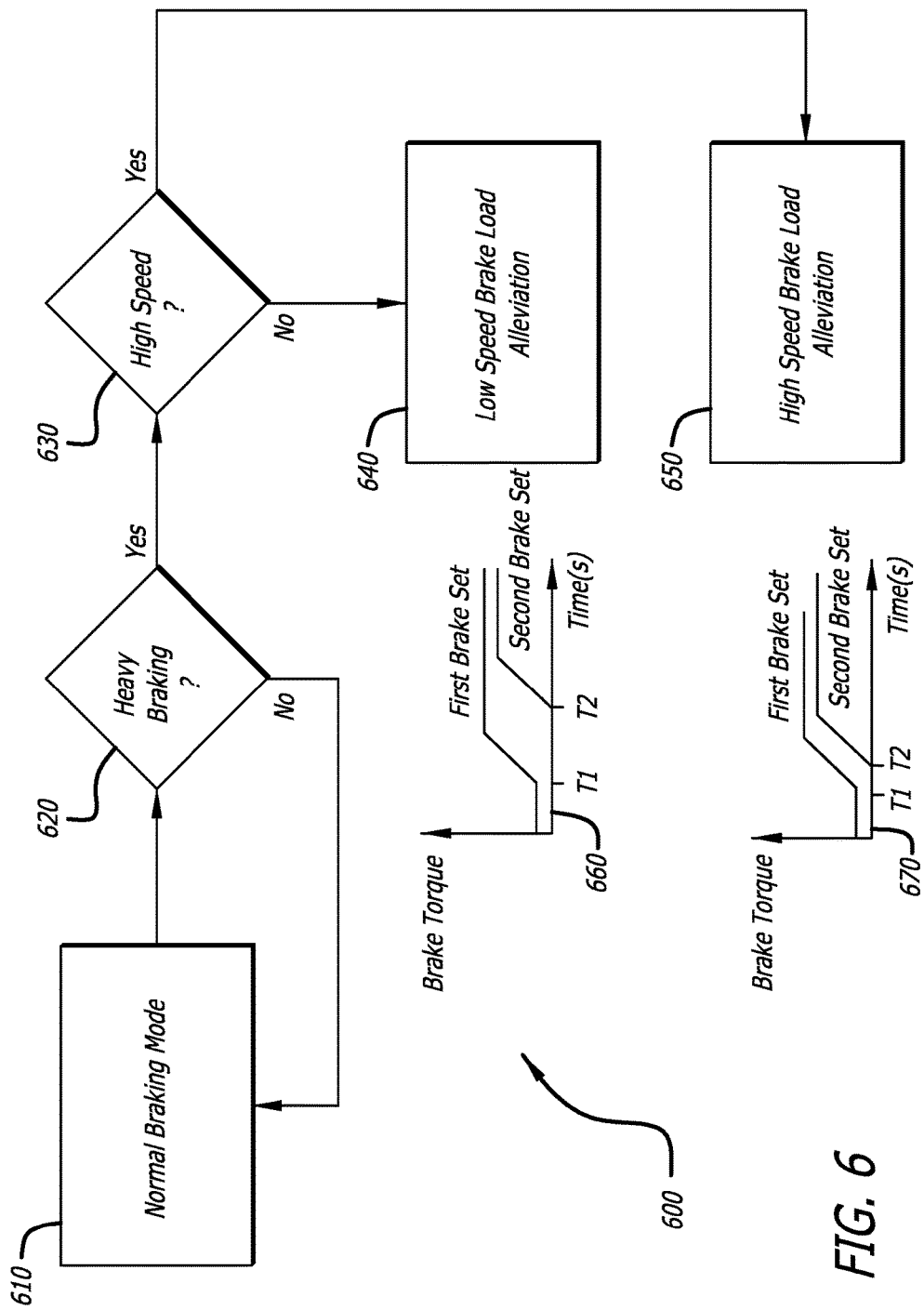

FIG. 6 is a schematic diagram depicting another disclosed logic for brake load alleviation amongst at least one first brake and at least one second brake for a vehicle, where it shows that a low speed brake application profile has a greater delay between actuation of at least one first brake and at least one second brake than the delay between actuation of at least one first brake and at least one second brake of a high speed brake application profile, in accordance with at least one embodiment of the present disclosure.

Figure 7:
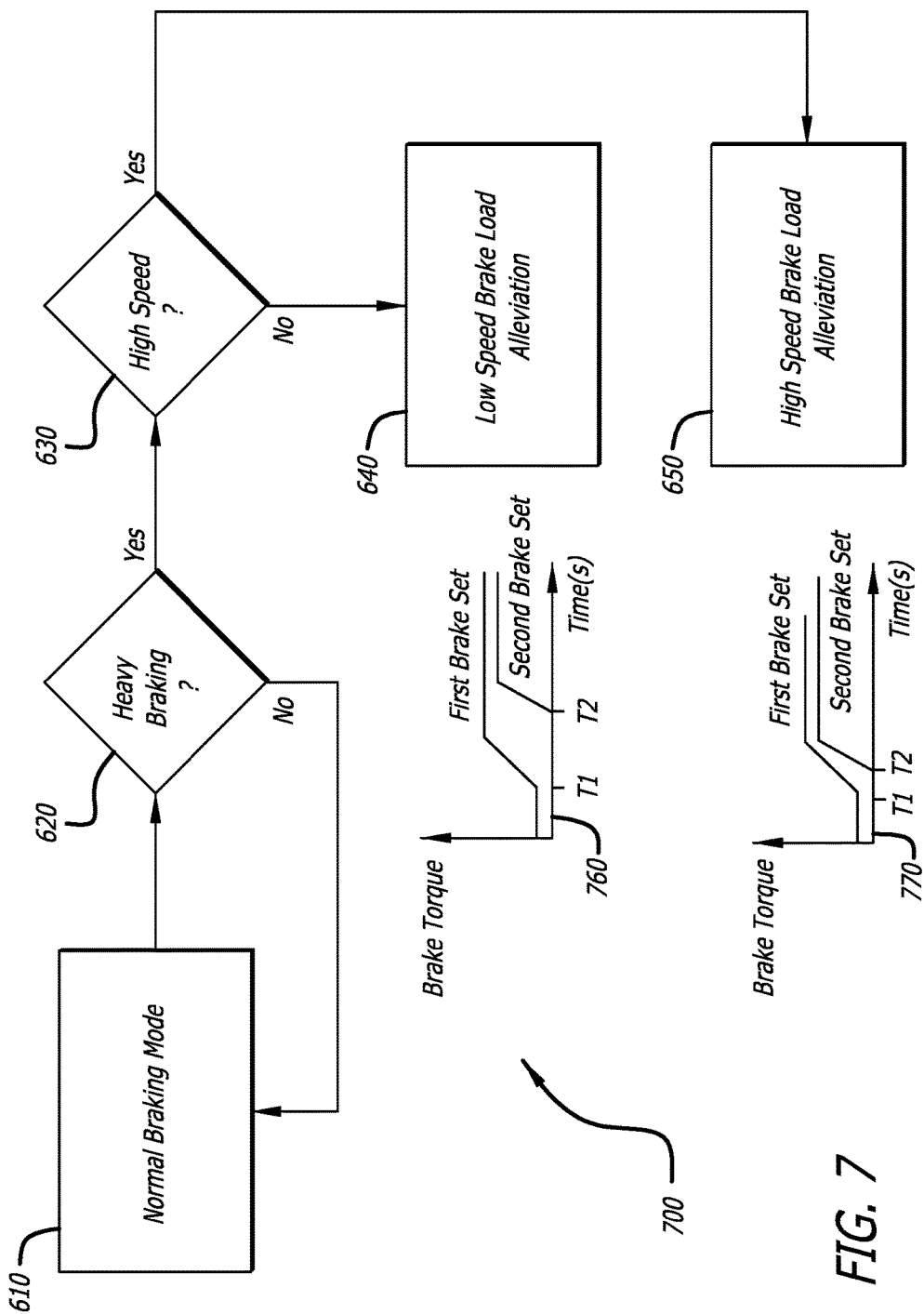

FIG. 7 is a schematic diagram depicting another disclosed logic for brake load alleviation amongst at least one first brake and at least one second brake for a vehicle, where it shows that (1) a low speed brake application profile has a greater delay between actuation of at least one first brake and at least one second brake than the delay between actuation of at least one first brake and at least one second brake of a high speed brake application profile, and it shows that (2) actuation of at least one second brake is at a higher rate than actuation of at least one first brake, in accordance with at least one embodiment of the present disclosure.

Figure 8:
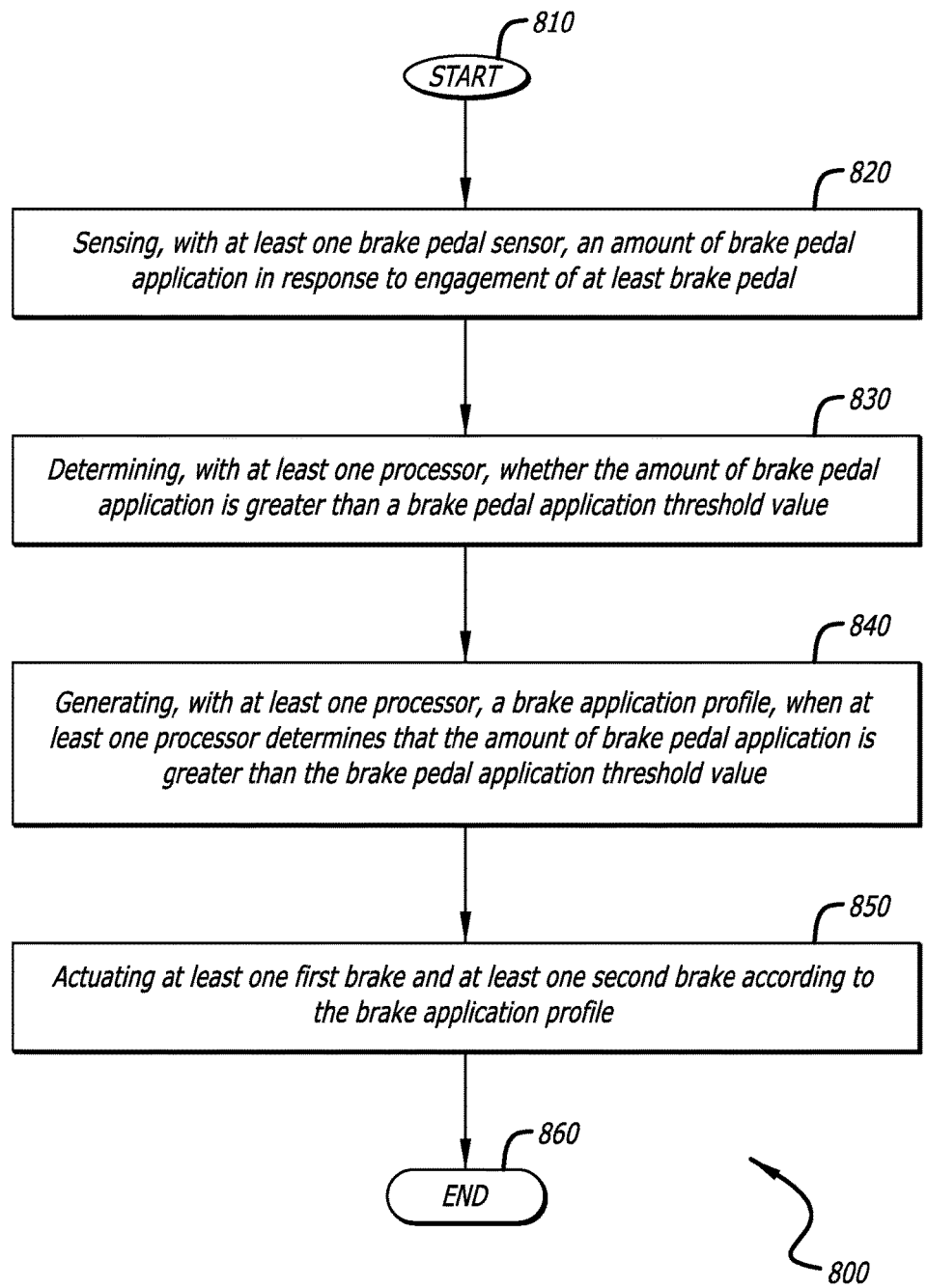

FIG. 8 is a flow diagram showing the disclosed method for brake load alleviation amongst at least one first brake and at least one second brake for a vehicle, in accordance with at least one embodiment of the present disclosure.

FIG. 9 is a flow diagram showing another disclosed method for brake load alleviation amongst at least one first brake and at least one second brake for a vehicle, in accordance with at least one embodiment of the present disclosure.

DESCRIPTION

The methods and apparatus disclosed herein provide an operative system for stopping energy based selection logic for taxi brake release. In particular, the disclosed system provides a braking scheme to balance multiple goals of an aircraft, including reducing brake wear and reducing brake temperatures. The disclosed system also provides a means to maintain lower loads to the airplane structure during braking, which in turn allows for reduced structural weight due to the lower design loads.

Specifically, for this braking scheme, there is a ramping of the actuation of the brakes, and there is a delaying of the actuation of a portion of the brakes (e.g., the forward brakes are actuated at a certain time delay after the aft brakes are actuated) for high deceleration stops. Delaying the actuation of a portion of the brakes helps to lower the maximum loading of the nose gear and/or fuselage of the aircraft during the onset of the braking. Depending upon the airplane speed, the braking effort, and various other conditions, the length of the delay can be applied at various airplane speeds to satisfy different braking scenarios.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic representations shown in the figures depict example arrangements of elements, additional intervening elements, devices, features, or components may be present in an embodiment of the invention.

Figure 1A:
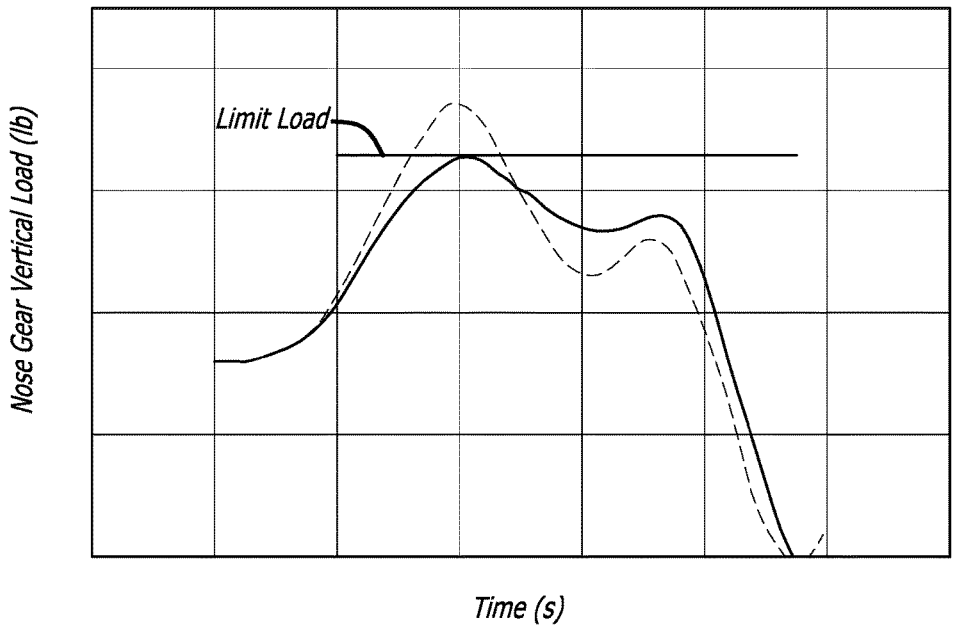
FIG. 1A is a graph that illustrates time in seconds (s) versus the amount of nose gear vertical load in pounds (lb).
Figure 1B:
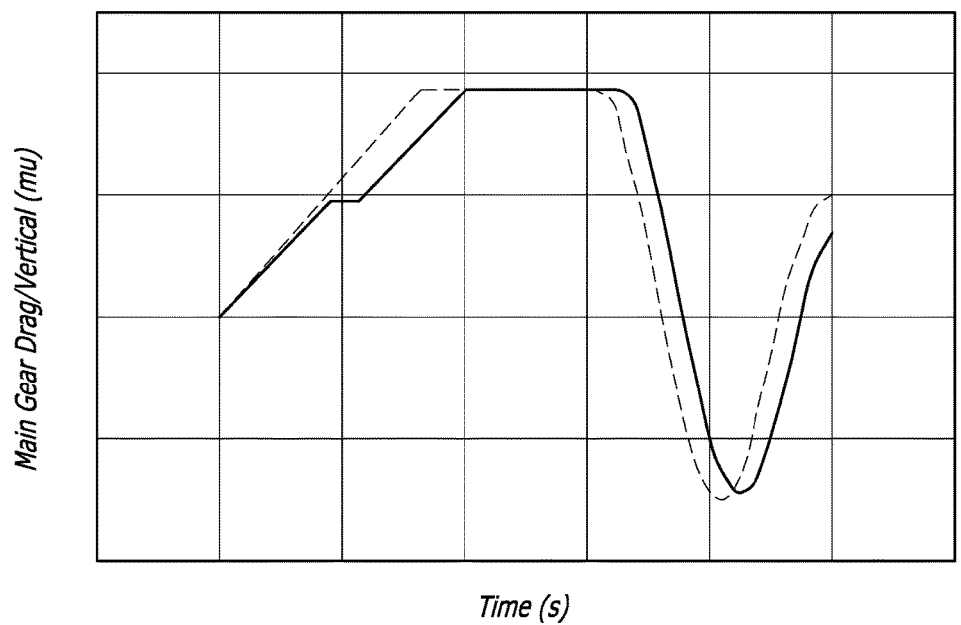
FIG. 1B is a graph that illustrates time in seconds (s) versus the amount of main gear drag/vertical in coefficients of friction (mu).
Figure 2A:
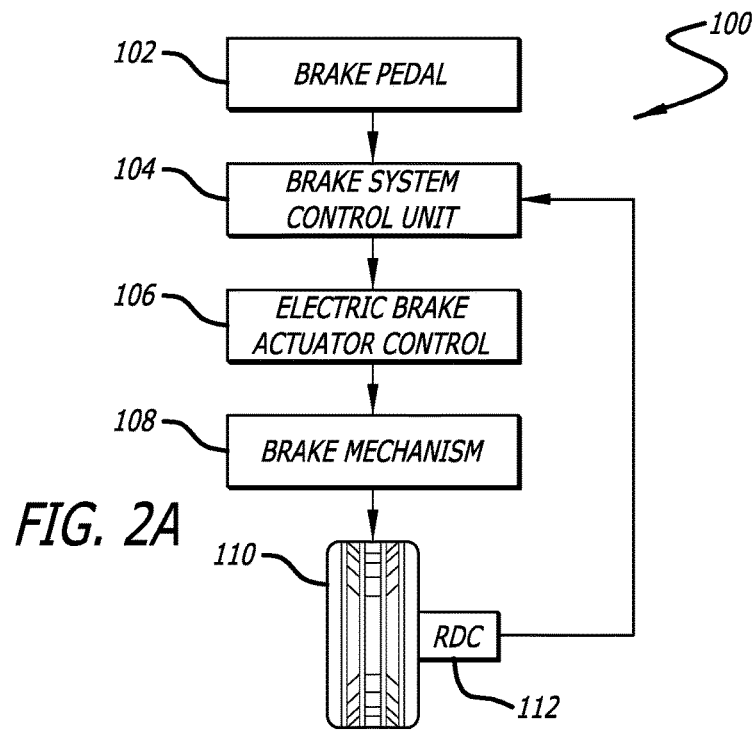
FIG. 2A is a schematic representation of a portion of an electric brake system suitable for use in an aircraft (i.e. a vehicle) that may be employed by the disclosed system for brake load alleviation, in accordance with at least one embodiment of the present disclosure.

FIG. 2A is a schematic representation of a portion of an electric brake system 100 suitable for use in an aircraft (not shown). Electric brake system 100 includes a brake pedal 102, a brake system control unit (BSCU) 104 coupled to brake pedal 102, an electric brake actuator control (EBAC) 106 coupled to BSCU 104, and a brake mechanism 108 coupled to EBAC 106. Brake mechanism 108 corresponds to at least one wheel 110 of the aircraft. Electric brake system 100 may also include an axle-mounted remote data concentrator (RDC) 112 coupled to wheel 110. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 100 can be applied to any number of electric braking configurations for an aircraft, and electric brake system 100 is depicted in a simplified manner for ease of description. An embodiment of electric brake system 100 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 100 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 100. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 100 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and feel if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 104 is implemented with a computer processor (such as a PowerPC 555) that hosts software and provides external interfaces for the software.

BSCU 104 monitors various aircraft inputs to provide control functions such as, without limitation: pedal braking; parking braking; automated braking; and gear retract braking. In addition, BSCU 104 blends antiskid commands (which could be generated internally or externally from BSCU 104) to provide enhanced control of braking BSCU 104 obtains pilot command control signals from brake pedal 102, along with wheel data (e.g., wheel speed, rotational direction, tire pressure, etc.) from RDC 112, as described in more detail below. BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC 555) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 100. Such a brake control architecture includes suitably configured processing logic, functionality, and features that support the load alleviation and brake control operations described herein.

Wheel 110 may include an associated brake mechanism 108. EBAC 106 controls brake mechanism 108 to apply, release, modulate, and otherwise control the actuation of one or more components of brake mechanism 108. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 100 may include or communicate with one or more sensors for wheel 110. These sensors are suitably configured to measure wheel data (wheel speed, direction of wheel rotation, tire pressure, wheel/brake temperature, etc.) for wheel 110, where the wheel data can be utilized by electrical braking system 100. RDC 112 is generally configured to receive, measure, detect, or otherwise obtain data for processing and/or transmission to another component of electric brake system 100. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data to BSCU 104 and EBAC 106.

In this example, electric brake system 100 is suitably configured to control the actuation of brake mechanism 108 in response to the wheel data. In particular, electric brake system 100 is configured to control the actuation of brake mechanism 108 in response to a wheel speed value, which indicates the current speed of the aircraft.

Electric brake system 100 can be utilized to alleviate dynamic structural loads (e.g., landing gear loads) during high effort braking of the aircraft. Electric brake system 100 generally commands brake mechanism 108 to generate brake torque in a manner that is related to the amount that brake pedal 102 is deflected by the pilot. This control can take into account the deflection position of brake pedal 102, the deflection rate of brake pedal 102, and/or the speed at which the aircraft is traveling to modify the actuation of brake mechanism 108 such that the desired brake torque is obtained at a suitable rate that does not develop high peak dynamic loads. This allows the aircraft landing gear to be designed with less weight and bulk, which benefits aircraft performance. In one embodiment, electric brake system 100 uses sensors at brake pedal 102 to measure the deflection and deflection rate of brake pedal 102. Aircraft wheel speed, which may be measured by a sensor at wheel 110, is also used as an input to the brake control laws. BSCU 104 processes these inputs to reduce the initial onset rate of brake application, which in turn reduces the peak brake load that has to be absorbed by the landing gear structure. The brake control laws can be tuned for the particular model of aircraft, static, dynamic, or operational characteristics of the aircraft, and/or static, dynamic, or operational characteristics of brake mechanism 108.

Figure 2B:
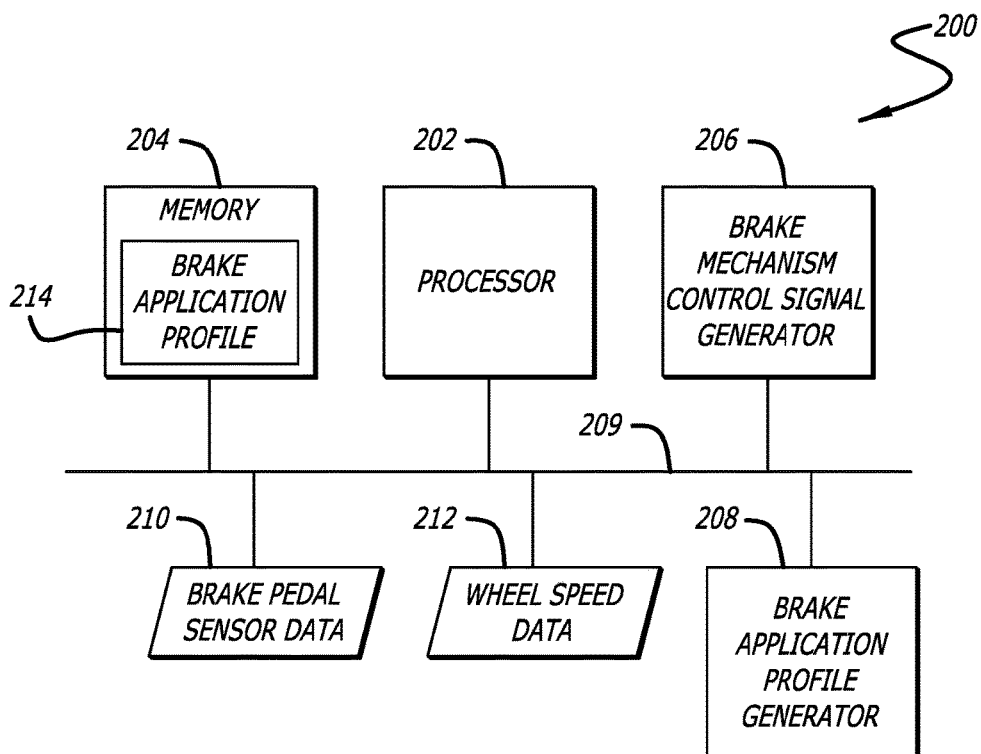
FIG. 2B is a schematic representation of a brake control architecture suitable for use in an electric brake system for an aircraft (i.e. a vehicle) that may be employed by the disclosed system for brake load alleviation, in accordance with at least one embodiment of the present disclosure.

FIG. 2B is a schematic representation of a brake control architecture 200 suitable for use in an electric brake system for an aircraft. Electric brake system 100 may employ an embodiment of brake control architecture 200. For example, brake control architecture 200 may be implemented or realized in BSCU 104 and/or EBAC 106. Brake control architecture 200 may include, without limitation: a processor 202 having suitably configured processing logic; an appropriate amount of memory 204; and a brake mechanism control signal generator 206. Brake control architecture 200 may, but need not, include a brake application profile generator 208. These elements may be coupled together using a data communication bus 209 or any suitably configured interconnection architecture or arrangement. In this embodiment, brake control architecture 200 is configured to obtain and process brake pedal sensor data 210 and wheel speed data 212 in the manner described in more detail below.

Processor 202 may be implemented, performed, or realized in the manner described above for BSCU 104. The processing logic corresponding to processor 202 is designed to carry out various operations and functions associated with the electric brake control scheme described herein. Furthermore, a method or algorithm (or portions thereof) described in connection with the embodiments disclosed herein may be embodied directly in hardware, in firmware, in a software module executed by processor 202, or in any practical combination thereof. A software module may reside in memory 204, which may be realized as one or more physical components having RAM memory, flash memory, ROM memory, EPROM memory, EEPROM memory, registers, a hard disk, a removable disk, a CD-ROM, or any other form of storage medium known in the art. In this regard, memory 204 can be coupled to processor 202 such that processor 202 can read information from, and write information to, memory 204. In the alternative, memory 204 may be integral to processor 202. As an example, processor 202 and memory 204 may reside in an ASIC.

Memory 204 may be configured to store at least one brake application profile 214 for the aircraft. Brake application profile 214 influences the manner in which the brake mechanism is actuated. Brake application profile 214 may be predetermined and programmed into brake control architecture 200 or generated in real-time by brake control architecture 200. In the former situation, brake application profile 214 may be based upon static, dynamic, aerodynamic, operational, and/or other characteristics of the aircraft (e.g., the mass of the aircraft and the typical landing speed of the aircraft) and/or based upon static, dynamic, operational and/or other characteristics of the electric brake system or brake mechanism (e.g., the response time of the control elements, the maximum achievable brake torque, and the typical range of brake torque). In the latter situation, the optional brake application profile generator 208 may be utilized to generate brake application profile 214 dynamically in response to brake pedal sensor data 210 and/or in response to wheel speed data 212. The operation of brake application profile generator 208 may also be influenced by aircraft characteristics and/or brake mechanism characteristics as mentioned above. In practice, brake application profile generator 208 may be realized in the processing logic of processor 202.

Figure 3:
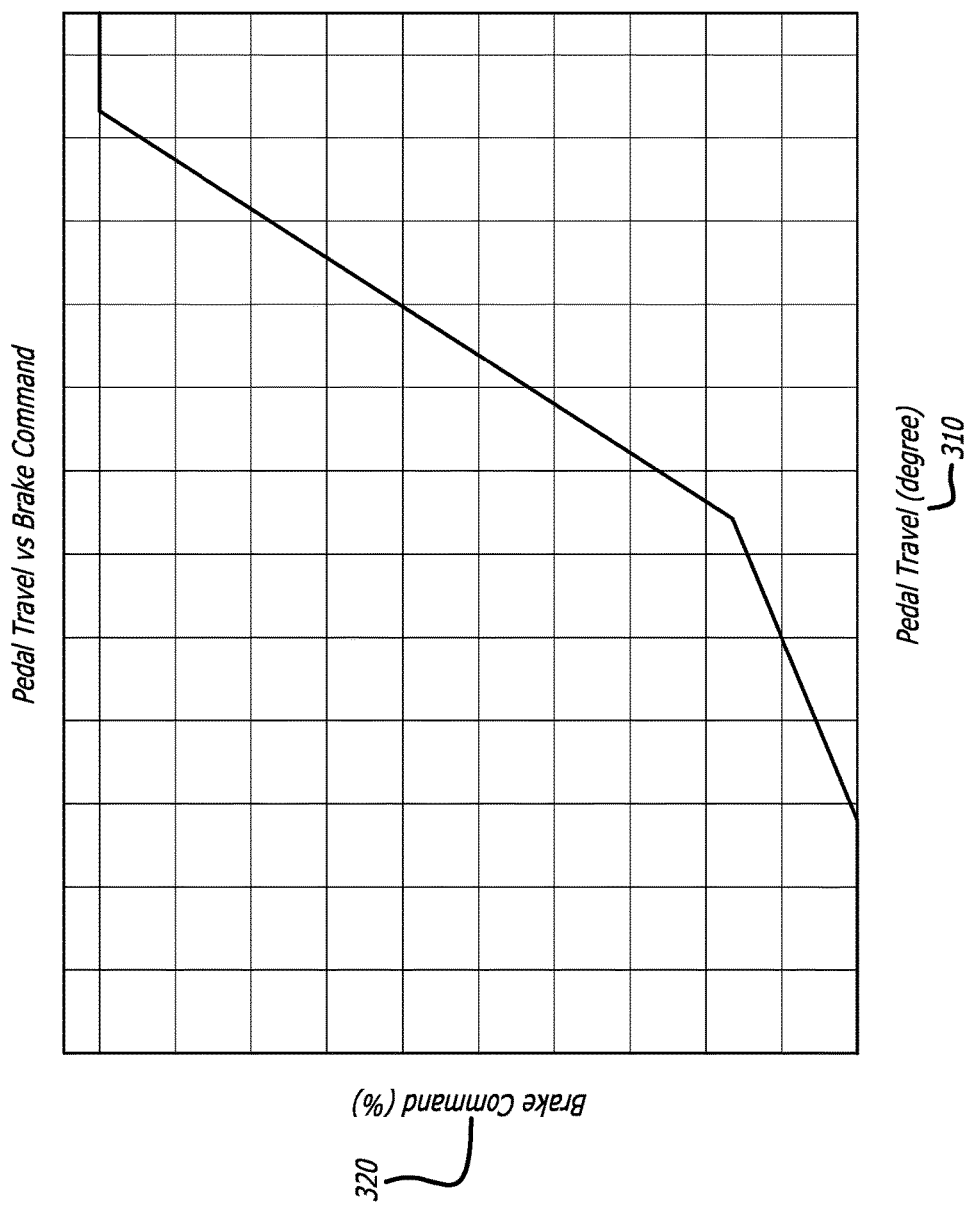
FIG. 3 is a graph that illustrates the amount of brake pedal travel versus the amount of brake command.

FIG. 3 is a graph 300 that illustrates the amount of brake pedal travel 310 versus the amount of brake command 320. On this graph 300, the amount of brake pedal travel 310 is represented in degrees of depression of the brake pedal on the x-axis. And, the amount of brake command force is represented in percentages on the y-axis. For example, when the brake pedal is depressed 5 degrees by the pilot, this amount of depression corresponds to 10 percent of the total braking command force. Also, for example, when the brake pedal is depressed 12 degrees by the pilot, this amount of depression corresponds to 100 percent of the total braking command force (i.e. the maximum amount of braking command force).

It should be noted that the various tasks performed in connection with the logic in FIGS. 4-7 and the various tasks performed in connection with the methods of FIGS. 8 and 9 may be performed by software, hardware, firmware, or any combination thereof. For illustrative purposes, the following description of the logic of FIGS. 4-7 and the methods of FIGS. 8 and 9 may refer to elements mentioned above in connection with FIGS. 2-3. In embodiments of the invention, portions of the logic of FIGS. 4-7 and the methods of FIGS. 8 and 9 may be performed by different elements of the described system (e.g., the BSCU, the EBAC, and/or the brake mechanism). It should be appreciated that the logic of FIGS. 4-7 and the methods of FIGS. 8 and 9 may include any number of additional or alternative tasks; the tasks shown in the logic of FIGS. 4-7 and the methods of FIGS. 8 and 9 need not be performed in the illustrated order; and the logic of FIGS. 4-7 and the methods of FIGS. 8 and 9 may be incorporated into a more comprehensive procedure or process having additional functionality not described in detail herein.

Figure 4:
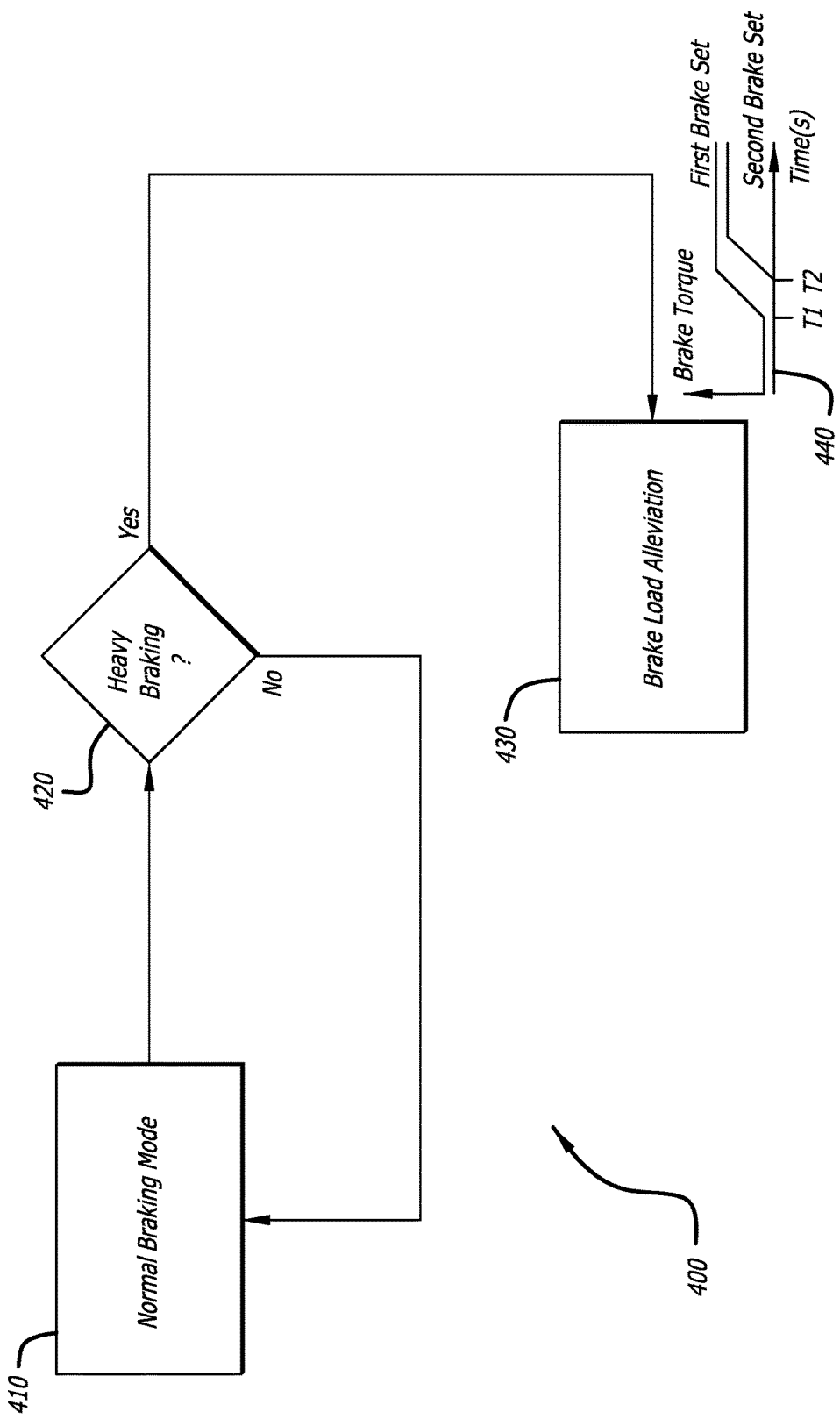
FIG. 4 is a schematic diagram depicting the disclosed logic for brake load alleviation amongst at least one first brake and at least one second brake for a vehicle, where the brake application profile shows that actuation of at least one second brake is delayed after actuation of at least one first brake, in accordance with at least one embodiment of the present disclosure.

FIG. 4 is a schematic diagram 400 depicting the disclosed logic for brake load alleviation amongst at least one first brake and at least one second brake for a vehicle, where the brake application profile 440 shows that actuation of at least one second brake is delayed after actuation of at least one first brake, in accordance with at least one embodiment of the present disclosure. In this figure, at the start of the logic, a normal braking mode 410 exists where the brake system is ready to be used (i.e. the brakes are on standby to be commanded for actuation). Then, at least one processor then determines whether a heavy braking condition exists 420. A heavy breaking condition may be defined, for example, to be when the braking force applied by the pilot to at least one brake pedal transitions from below 9 percent to above 65 percent of the total braking force (i.e. the total braking force is at 100 percent).

If at least one processor determines that a heavy braking condition does not exist, a normal braking mode 410 simply persists. However, if at least one processor determines that a heavy braking condition does exist, a brake load alleviation function 430 is performed. When a brake load alleviation function 430 is performed, at least one processor generates a brake application profile 440 to be executed. In this figure, the brake application profile 440 shows that a first set of brakes will start to be actuated at time equals t1, and thereafter will be actuated to a certain brake torque level at a certain ramp rate. In addition, the brake application profile 440 shows that a second set of brakes will start to be actuated at time equals t2, and thereafter will be actuated to a certain brake torque level at a certain ramp rate. For brake application profile 440, the ramp rate of actuation for the first set of brakes is shown to be the same as the ramp rate of actuation of the second set of brakes.

It should be noted that the first set of brakes may be the forward brakes, and the second set of brakes may be the aft brakes. Alternatively, the first set of brakes may be the aft brakes, and the second set of brakes may be the forward brakes. Also, alternatively, the first set of brakes may be some of the brakes of the total brake system, and the second set of brakes may simply be the remaining brakes from the total brake system that are not part of the first set of brakes.

FIG. 5 is a schematic diagram 500 depicting the disclosed logic for brake load alleviation amongst at least one first brake and at least one second brake for a vehicle, where the brake application profile 540 shows that (1) actuation of at least one second brake is delayed after actuation of at least one first brake and shows that (2) actuation of at least one second brake is at a higher rate than actuation of at least one first brake, in accordance with at least one embodiment of the present disclosure. It should be noted that the ramp rate is a function of the amount and rate of actuation. In this figure, the logic follows the same as the logic in FIG. 4. However, in this figure, the brake application profile 540 that is generated is different than the brake application profile 440 that is generated in FIG. 4.

In this figure, the brake application profile 540 shows that a first set of brakes will start to be actuated at time equals t1, and thereafter will be actuated to a certain brake torque level at a certain ramp rate (i.e. a first ramp rate). In addition, the brake application profile 540 shows that a second set of brakes will start to be actuated at time equals t2, and thereafter will be actuated to a certain brake torque level at a certain ramp rate (i.e. a second ramp rate). For brake application profile 540, the ramp rate of actuation for the first set of brakes (i.e. the first ramp rate) is shown to be less than the ramp rate of actuation of the second set of brakes (i.e. the second ramp rate).

FIG. 6 is a schematic diagram 600 depicting another disclosed logic for brake load alleviation amongst at least one first brake and at least one second brake for a vehicle, where it shows that a low speed brake application profile 660 has a greater delay between actuation of at least one first brake and at least one second brake than the delay between actuation of at least one first brake and at least one second brake of a high speed brake application profile 670, in accordance with at least one embodiment of the present disclosure.

In this figure, at the start of the logic, a normal braking mode 610 exists where the brake system is ready to be used (i.e. the brakes are on standby to be commanded for actuation). Then, at least one processor then determines whether a heavy braking condition exists 620.

If at least one processor determines that a heavy braking condition does not exist, a normal braking mode 610 simply persists. However, if at least one processor determines that a heavy braking condition does exist, at least one processor then determines whether a high speed condition exists 630. A high speed condition may be defined, for example, to be when the speed of at least one wheel is between 45 and 70 knots.

If at least one processor determines that a high speed condition does not exist, a low speed brake load alleviation function 640 is performed. When a low speed brake load alleviation function 640 is performed, at least one processor generates a low speed brake application profile 660 to be executed. In this figure, the low speed brake application profile 660 shows that a first set of brakes will start to be actuated at time equals t1, and thereafter will be actuated to a certain brake torque level at a certain ramp rate. In addition, the low speed brake application profile 660 shows that a second set of brakes will start to be actuated at time equals t2, and thereafter will be actuated to a certain brake torque level at a certain ramp rate. For low speed brake application profile 660, the ramp rate of actuation for the first set of brakes is shown to be the same as the ramp rate of actuation of the second set of brakes.

If at least one processor determines that a high speed condition does exist, a high speed brake load alleviation function 650 is performed. When a high speed brake load alleviation function 650 is performed, at least one processor generates a high speed brake application profile 670 to be executed. In this figure, the high speed brake application profile 670 shows that a first set of brakes will start to be actuated at time equals t1, and thereafter will be actuated to a certain brake torque level at a certain ramp rate. In addition, the high speed brake application profile 670 shows that a second set of brakes will start to be actuated at time equals t2, and thereafter will be actuated to a certain brake torque level at a certain ramp rate. For high speed brake application profile 670, the ramp rate of actuation for the first set of brakes is shown to be the same as the ramp rate of actuation of the second set of brakes.

It is important to notice that the difference between t1 and t2 for the low speed brake application profile 660 is greater than the difference between t1 and t2 for the high speed brake application profile 670. As such, the actuation of the second set of brakes for the low speed brake application profile 660 is delayed longer than the actuation of the second set of brakes for the high speed brake application profile 670.

It should be noted that in one or more embodiments, for the high speed brake application profile 670, a first set of brakes will start to be actuated at first time delay and a second set of brakes will start to be actuated at a second time delay, where the second time delay is greater than the first time delay. And, for the low speed brake application profile 660, a first set of brakes will start to be actuated at third time delay and a second set of brakes will start to be actuated at a fourth time delay, where the fourth time delay is greater than the third time delay. Additionally, the difference between the first time delay and the second time delay is less than the difference between the third time delay and the fourth time delay.

FIG. 7 is a schematic diagram 700 depicting another disclosed logic for brake load alleviation amongst at least one first brake and at least one second brake for a vehicle, where it shows that (1) a low speed brake application profile 760 has a greater delay between actuation of at least one first brake and at least one second brake than the delay between actuation of at least one first brake and at least one second brake of a high speed brake application profile 770, and it shows that (2) actuation of at least one second brake is at a higher rate than actuation of at least one first brake, in accordance with at least one embodiment of the present disclosure. In this figure, the logic follows the same as the logic in FIG. 6. However, in this figure, the low speed brake application profile 760 and the high speed brake application profile 770 that are generated are different than the low speed brake application profile 660 and the high speed brake application profile 670 that are generated in FIG. 6.

In this figure, the high speed brake application profile 760 shows that a first set of brakes will start to be actuated at time equals t1, and thereafter will be actuated to a certain brake torque level at a certain ramp rate (i.e. a first ramp rate). In addition, the high speed brake application profile 760 shows that a second set of brakes will start to be actuated at time equals t2, and thereafter will be actuated to a certain brake torque level at a certain ramp rate (i.e. a second ramp rate). For low speed brake application profile 760, the ramp rate of actuation for the first set of brakes (i.e. the first ramp rate) is shown to be less than the ramp rate of actuation of the second set of brakes (i.e. the second ramp rate).

Similarly, the high speed brake application profile 770 shows that a first set of brakes will start to be actuated at time equals t1, and thereafter will be actuated to a certain brake torque level at a certain ramp rate (i.e. a first ramp rate). In addition, the high speed brake application profile 770 shows that a second set of brakes will start to be actuated at time equals t2, and thereafter will be actuated to a certain brake torque level at a certain ramp rate (i.e. a second ramp rate). For high speed brake application profile 770, the ramp rate of actuation for the first set of brakes (i.e. the first ramp rate) is shown to be less than the ramp rate of actuation of the second set of brakes (i.e. the second ramp rate).

Similar to FIG. 6, it is important to notice that the difference between t1 and t2 for the low speed brake application profile 760 is greater than the difference between t1 and t2 for the high speed brake application profile 770. As such, the actuation of the second set of brakes for the low speed brake application profile 760 is delayed longer than the actuation of the second set of brakes for the high speed application profile 770.

FIG. 8 is a flow diagram showing the disclosed method 800 for brake load alleviation amongst at least one first brake and at least one second brake for a vehicle, in accordance with at least one embodiment of the present disclosure. At the start 810 of the method 800, at least one brake pedal sensor senses an amount of brake pedal application in response to engagement of at least one brake pedal 820. Then, at least one processor determines whether the amount of brake pedal application is greater than a brake pedal application threshold value 830. It should be noted that in some embodiments, the brake pedal application threshold value may actually be a range of values or may be a range of a rate of application of the brake pedal(s).

At least one processor generates a brake application profile, when at least one processor determines that the amount of brake pedal application is greater than the brake pedal application threshold value 840.

The brake application profile indicates that actuation of at least one first brake is delayed by a first time delay, and that actuation of at least one second brake is delayed by a second time delay. In some embodiments, the first time delay is greater than the second time delay. In other embodiments, the second time delay is greater than the first time delay. In yet other embodiments, the brake application profile indicates that actuation of at least one first brake is not delayed and that actuation of at least one second brake is delayed by a time delay.

The brake application profile indicates that actuation of at least one first brake increases at a first rate over time and that actuation of at least one second brake increases at a second rate over time. In some embodiments, at least one first brake is at least one forward brake, and at least one second brake is at least one aft brake. In other embodiments, at least one first brake is at least one aft brake, and at least one second brake is at least one forward brake.

The amount of brake pedal application is related to a rate of the engagement of at least brake pedal. The rate of the engagement of at least one brake pedal is related to an amount of braking force applied to at least brake pedal, and/or the rate of the engagement of at least one brake pedal is related to a degree that at least brake pedal is depressed.

Then, referring back to the method 800, at least one first brake and at least one second brake are actuated according to the brake application profile 85. Then, the method 800 ends 860.

FIG. 9 is a flow diagram showing another disclosed method 900 for brake load alleviation amongst at least one first brake and at least one second brake for a vehicle, in accordance with at least one embodiment of the present disclosure. At the start 910 of the method, at least one brake pedal sensor senses an amount of brake pedal application in response to engagement of at least one brake pedal 920. Then, at least one wheel speed sensor senses an amount of wheel speed for at least one wheel 930.

At least one processor then determines whether the amount of wheel speed is greater than a wheel speed threshold value, when at least one processor determines that the amount of brake pedal application is greater than the brake pedal application threshold value 940. It should be noted that in some embodiments, the wheel speed threshold value may actually be a range of values of speed.

In some embodiments, at least one vehicle speed sensor may be employed instead of or in addition to at least one wheel speed sensor. Also, a vehicle speed threshold value may be utilized instead of or in addition to the wheel speed threshold value.

Then, at least one processor generates a first brake application profile (i.e. a high speed brake application profile), when at least one processor determines that the wheel speed is greater than a wheel speed threshold value 950. The first brake application profile indicates that actuation of at least one first brake is delayed by a first time delay and that actuation of at least one second brake is delayed by a second time delay. In some embodiments, the first brake application profile indicates that actuation of at least one first brake increases at a first rate over time and that actuation of at least one second brake increases at a second rate over time. At least one first brake and at least one second brake are actuated according to the first brake application profile 960.

At least one processor then generates a second brake application profile (i.e. a low speed brake application profile), when at least one processor determines that the wheel speed is not greater than a wheel speed threshold value 970. The second brake application profile indicates that actuation of at least one first brake is delayed by a third time delay and that actuation of at least one second brake is delayed by a fourth time delay. In at least one embodiment, the second brake application profile indicates that actuation of at least one first brake increases at a first rate over time and that actuation of at least one second brake increases at a second rate over time.

In some embodiments, a difference between the first time delay and the second time delay is less than a difference between the third time delay and the fourth time delay. In one or more embodiments, the third time delay is greater than the fourth time delay. In other embodiments, the fourth time delay is greater than the third time delay.

Then, referring back to method 900, at least one first brake and at least one second brake are then actuated according to the second brake application profile 980. Then, the method 900 ends 990.

It should be noted that the vehicle employed by the disclosed system, method, and apparatus for brake load alleviation functions may be an airborne vehicle, a terrestrial vehicle, or a marine vehicle. In some embodiments, the airborne vehicle may be an aircraft. For these embodiments, the forward and aft brakes are associated with at least one landing gear truck containing at least one wheel. In one or more embodiments, the terrestrial vehicle may be a train, a truck, a trailer, an automobile, a motorcycle, or a tank. In some embodiments, the marine vehicle may be a boat or a ship. For these embodiments, the forward and aft brakes are associated with at least one propeller of the marine vehicle. It should also be noted that in some embodiments, a vehicle speed sensor(s) may be used instead or in conjunction with a wheel speed sensor(s). For these embodiments, a vehicle speed threshold value will be utilized as well.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for brake load alleviation amongst at least one first brake and at least one second brake for a vehicle, the method comprising: sensing, with at least one brake pedal sensor, an amount of brake pedal application in response to engagement of at least one brake pedal; sensing, with at least one speed sensor, an amount of speed; determining, with at least one processor, whether the amount of brake pedal application is greater than a brake pedal application threshold value; determining, with the at least one processor, whether the amount of speed is greater than a speed threshold value, when the at least one processor determines that the amount of brake pedal application is greater than the brake pedal application threshold value; generating, with the at least one processor, a first brake application profile, when the at least one processor determines that the amount of speed is greater than the speed threshold value; and generating, with the at least one processor, a second brake application profile, when the at least one processor determines that the amount of speed is not greater than the speed threshold value, wherein the first brake application profile indicates that actuation of the at least one first brake is delayed by a first time delay and that actuation of the at least one second brake is delayed by a second time delay, wherein the second brake application profile indicates that actuation of the at least one first brake is delayed by a third time delay and that actuation of the at least one second brake is delayed by a fourth time delay, and wherein a difference between the first time delay and the second time delay is less than a difference between the third time delay and the fourth time delay.

2. The method of claim 1, wherein the at least one speed sensor is at least one of a wheel speed sensor or a vehicle speed sensor.

3. The method of claim 1, wherein the speed threshold value is one of a wheel speed threshold value or a vehicle speed threshold value.

4. The method of claim 1, wherein the method further comprises actuating the at least one first brake and the at least one second brake according to one of the first brake application profile or the second brake application profile.

5. The method of claim 1, wherein the first brake application profile indicates that actuation of the at least one first brake increases at a first rate over time and that actuation of the at least one second brake increases at a second rate over time.

6. The method of claim 1, wherein the second brake application profile indicates that actuation of the at least one first brake increases at a first rate over time and that actuation of the at least one second brake increases at a second rate over time.

7. The method of claim 1, wherein the at least one first brake is at least one forward brake, and wherein the at least one second brake is at least one aft brake.

8. The method of claim 1, wherein the at least one first brake is at least one aft brake, and wherein the at least one second brake is at least one forward brake.

9. The method of claim 1, wherein the amount of brake pedal application is related to a rate of engagement of the at least one brake pedal.

10. The method of claim 9, wherein the rate of the engagement of the at least one brake pedal is related to an amount of braking force applied to the at least one brake pedal and/or is related to a degree that the at least one brake pedal is depressed.

11. A system for brake load alleviation amongst at least one first brake and at least one second brake for a vehicle, the system comprising: at least one brake pedal; at least one brake pedal sensor to sense an amount of brake pedal application in response to engagement of the at least one brake pedal; at least one wheel; at least one wheel speed sensor to sense an amount of wheel speed of the at least one wheel; and at least one processor to generate a first brake application profile and a second brake application profile, to determine whether the amount of brake pedal application is greater than a brake pedal application threshold value, to determine whether the amount of wheel speed is greater than a wheel speed threshold value when the at least one processor determines that the amount of brake pedal application is greater than the brake pedal application threshold value, to apply a first brake application profile when the at least one processor determines that the wheel speed is greater than the wheel speed threshold value, and to apply a second brake application profile when the at least one processor determines that the wheel speed is not greater than the wheel speed threshold value, wherein the first brake application profile indicates that the actuation of the at least one first brake is delayed by a first time delay and that actuation of the at least one second brake is delayed by a second time delay, wherein the second brake application profile indicates that actuation of the at least one first brake is delayed by a third time delay and that actuation of the at least one second brake is delayed by a fourth time delay, and wherein a difference between the first time delay and the second time delay is less than a different between the third time delay and the fourth time delay.

12. The system for brake load alleviation of claim 11, further comprising the at least one first brake and the at least one second brake.

13. The system for brake load alleviation of claim 11, wherein the first brake application profile indicates that actuation of at least one first brake increases at a first rate over time.

14. The system for brake load alleviation of claim 13, wherein the first brake application profile further indicates that actuation of the at least one second brake increases at a second rate over time.

15. The system for brake load alleviation of claim 11, wherein the second brake application profile indicates that actuation of at least one first brake increases at a first rate over time.

16. The system for brake load alleviation of claim 15, wherein the second brake application profile further indicates that actuation of the at least one second brake increases at a second rate over time.

17. The system for brake load alleviation of claim 11, wherein the amount of brake pedal application is related to a rate of engagement of the at least one brake pedal.

18. The system for brake load alleviation of claim 17, wherein the rate of the engagement of the at least one brake pedal is related to an amount of braking force applied to the at least one brake pedal and/or is related to a degree that the at least one brake pedal is depressed.

19. The system for brake load alleviation of claim 11, wherein the at least one first brake is at least one forward brake, and wherein the at least one second brake is at least one aft brake.

20. The system for brake load alleviation of claim 11, wherein the at least one first brake is at least one aft brake, and wherein the at least one second brake is at least one forward brake.

* * * * *